United States Patent
Uhrenholt et al.

(10) Patent No.: US 10,424,042 B2
(45) Date of Patent: Sep. 24, 2019

(54) REPLICATING GRAPHICS PROCESSOR OPERATION ON A DATA PROCESSING SYSTEM

(71) Applicant: Arm Limited, Cambridge (GB)

(72) Inventors: Olof Henrik Uhrenholt, Lomma (SE); Simone Pellegrini, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/923,651

(22) Filed: Mar. 16, 2018

(65) Prior Publication Data

US 2018/0276786 A1 Sep. 27, 2018

(30) Foreign Application Priority Data

Mar. 23, 2017 (GB) .................................. 1704578.2

(51) Int. Cl.
*G06T 1/20* (2006.01)
*G06F 9/455* (2018.01)

(52) U.S. Cl.
CPC ................ *G06T 1/20* (2013.01); *G06F 9/455* (2013.01)

(58) Field of Classification Search
None
See application file for complete search history.

(56) References Cited

U.S. PATENT DOCUMENTS

| | | |
|---|---|---|
| 2010/0214301 A1 | 8/2010 | Li |
| 2014/0281389 A1 | 9/2014 | Lokityukhin |
| 2016/0080451 A1* | 3/2016 | Morton ................. H04L 67/025 709/219 |
| 2017/0344093 A1* | 11/2017 | Ting .......................... G06F 1/28 |
| 2018/0082470 A1* | 3/2018 | Nijasure ............... G06T 15/005 |
| 2018/0121220 A1* | 5/2018 | Lei .......................... G06F 9/455 |

OTHER PUBLICATIONS

GB Combined Search and Examination Report dated Sep. 13, 2017, GB Patent Application No. GB1704578.2.

* cited by examiner

*Primary Examiner* — Joni Richer
(74) *Attorney, Agent, or Firm* — Vierra Magen Marcus LLP

(57) ABSTRACT

A data processing system replicates the operation of a target graphics processor using a graphics processor of the data processing system. A driver for the target graphics processor converts higher level commands and program expressions intended for the target graphics processor into lower level control data and instructions suitable for use by the target graphics processor. The lower level control data and instructions suitable for use by the target graphics processor are then converted into lower level control data and instructions for the graphics processor of the data processing system. The graphics processor of the data processing system then generates an output using the lower level control data and instructions for the graphics processor of the data processing system. The data processing system provides an efficient and comprehensive testing environment when replicating the operation of the target graphics processor.

17 Claims, 9 Drawing Sheets

REPLICATING GRAPHICS PROCESSOR OPERATION ON A DATA PROCESSING SYSTEM

BACKGROUND

The technology described herein relates to replicating the operation of a graphics processor on a data processing system.

Before implementation of a graphics processor, for example that forms part of a system on chip (SoC), the operation of the graphics processor can be replicated using a software model running on a central processor of a data processing system, such as general purpose computer system. This can allow various features of the graphics processor, SoC, etc., such as the hardware configuration, software/hardware interface, etc., to be tested and/or modified before implementation.

The Applicants believe that there remains scope for improvements to replicating the operation of graphics processors on data processing systems.

BRIEF DESCRIPTION OF THE DRAWINGS

Various embodiments of the technology described herein will be described by way of example only and with reference to the accompanying drawings, in which.

Figure 1:
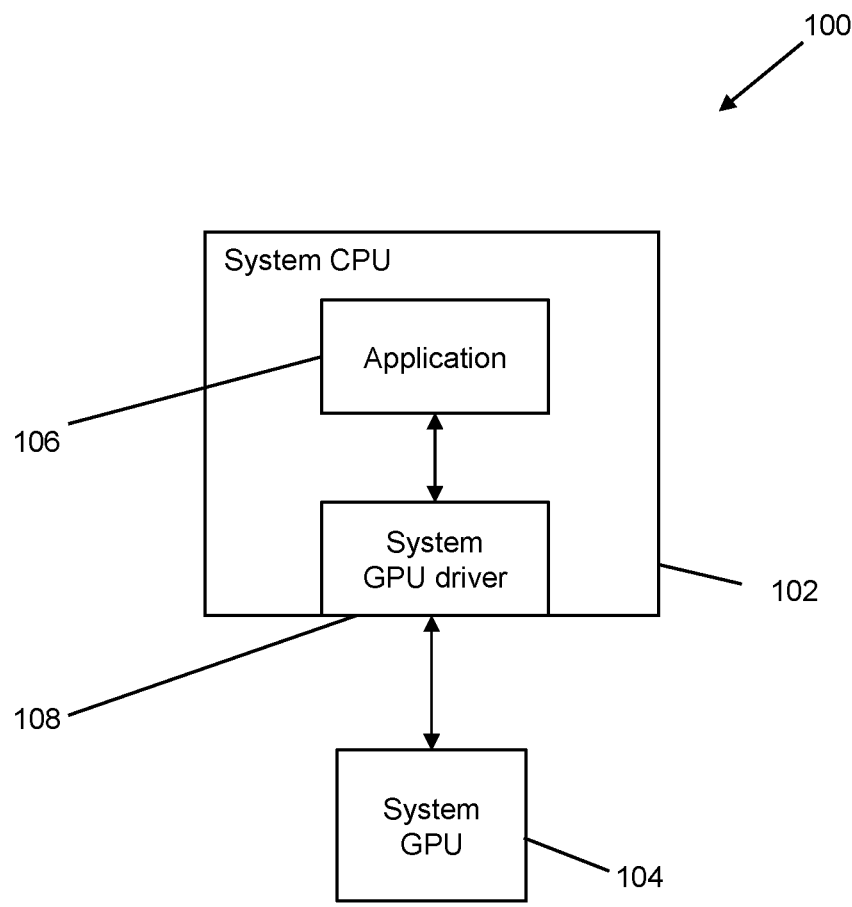
FIG. 1 shows schematically a data processing system that can be operated in the manner of the technology described herein.

The drawings show elements of a data processing system that are relevant to embodiments of the technology described herein. As will be appreciated by those skilled in the art, there may be other elements of the data processing system that are not illustrated in the drawings. It should also be noted that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of replicating the operation of a target graphics processor on a data processing system that comprises a graphics processor, the method comprising:

converting higher level commands intended for the target graphics processor into lower level control data suitable for use by the target graphics processor;

converting the lower level control data suitable for use by the target graphics processor into lower level control data for the graphics processor of the data processing system; and causing the graphics processor of the data processing system to generate an output using the lower level control data for the graphics processor of the data processing system.

Another embodiment of the technology described herein comprises a data processing system for replicating the operation of a target graphics processor, the data processing system comprising:

a graphics processor configured to generate an output using lower level control data; and data processing circuitry configured to:

convert higher level commands intended for the target graphics processor into lower level control data suitable for use by the target graphics processor;

convert the lower level control data suitable for use by the target graphics processor into lower level control data for the graphics processor of the data processing system; and cause the graphics processor of the data processing system to generate an output using the lower level control data for the graphics processor of the data processing system.

The Applicants have identified that replicating the operation of a target graphics processor on a data processing system can consume a significant amount of processing time and resources, particularly in typical arrangements in which the operation of the target graphics processor is replicated in software on a central processor of the data processing system. This is because central processors tend to have only a small number of processing cores and thus are not generally well suited to performing the data processing operations that are usually performed by a graphics processor (which often comprise executing many operations in parallel using many processing cores).

In the technology described herein however, rather than replicating the operation of a target graphics processor entirely on a central processor of the data processing system, the (test) data processing system makes use of a (native) graphics processor of that data processing system, which is generally better suited for performing the data processing operations that are usually performed by a graphics processor, for example by executing many operations in parallel using many processing cores of the graphics processor. This is despite the fact that the target graphics processor and graphics processor of the data processing system might be configured very differently. Thus, in the technology described herein, the amount of processing time and resources that are consumed when replicating the operation of a target graphics processor on a data processing system can be significantly lower than in typical arrangements.

The Applicants have further identified that replicating the operation of a target graphics processor on a data processing system typically requires a driver for the target graphics processor (which would usually be used to convert higher level commands for the target graphics processor into lower level control data for the target graphics processor) to be replaced, e.g. with code that converts the higher level commands intended for the target graphics processor directly into lower level control data for the central processor of the data processing system, such that the central processor of the data processing system can then follow the commands that were intended for the target graphics processor. This means that the operation of the target graphics processor may not be appropriately tested when replicating the operation of the target graphics processor on the data processing system since significant, e.g. driver, processes for the target graphics processor are replaced.

In the technology described herein however, the higher level commands intended for the target graphics processor are still converted into lower level control data suitable for use by the target graphics processor (e.g. as would be performed using a driver for the target graphics processor). This is despite the fact that that lower level control data is not actually going to be used by the target graphics processor. The data processing system then converts the lower level control data for the target graphics processor into lower level control data for the graphics processor of the data processing system, such that the graphics processor of the data processing system can then follow the original higher level commands which were intended for the target graphics processor. The technology described herein can therefore provide a more comprehensive testing environment for the target graphics processor by including a process of converting the higher level commands for the target graphics processor into lower level control data for the target graphics processor (e.g. as would be performed by a driver for the target graphics processor).

The higher level commands intended for the target graphics processor can take any desired and suitable form. For example, the higher level commands intended for the target graphics processor may comprise application programming interface (API) calls (e.g. job or draw calls) intended for the target graphics processor.

The lower level control data suitable for use by the target graphics processor can also take any desired and suitable form that can be interpreted and used by the target graphics processor. The lower level control data may, for example, comprise an indication of the settings (e.g. framebuffer settings, texture settings, etc.) and/or input/output resources (e.g. buffers) to be used by the target graphics processor. For example, the lower level control data suitable for use by the target graphics processor may comprise one or more (e.g. job or draw call) descriptors suitable for use by the target graphics processor.

The lower level control data for the graphics processor of the data processing system can also take any desired and suitable form that can be interpreted and used by the graphics processor of the data processing system. The lower level control data may, for example, comprise an indication of the settings (e.g. framebuffer settings, texture settings, etc.) and/or input/output resources (e.g. buffers) to be used by the graphics processor of the data processing system. For example, the lower level control data for the graphics processor of the data processing system may comprise one or more (e.g. job or draw call) descriptors suitable for use by the graphics processor of the data processing system.

Converting the higher level commands intended for the target graphics processor into lower level control data suitable for use by the target graphics processor may be performed in any desired and suitable way. For example, converting the commands intended for the target graphics processor into lower level control data suitable for use by the target graphics processor may comprise mapping API calls (e.g. job or draw calls) for the target graphics processor to (e.g. job or draw call) descriptors suitable for use by the target graphics processor.

Converting the higher level commands intended for the target graphics processor into the lower level control data suitable for use by the target graphics processor may also be performed in or by any desired and suitable part of the data processing system. For example, as is indicated above, a driver for the target graphics processor may perform this process. As indicated above, these embodiments can avoid the need to replace the driver for the target graphics processor.

Converting the lower level control data suitable for use by the target graphics processor into the lower level control data for the graphics processor of the data processing system may also be performed in any desired and suitable way. For example, embodiments may comprise converting the lower level control data suitable for use by the target graphics processor into higher level commands for the graphics processor of the data processing system. Embodiments may then comprise converting the higher level commands for the graphics processor of the data processing system into the lower level control data for the graphics processor of the data processing system.

The higher level commands for the graphics processor of the data processing system can also take any desired and suitable form. For example, the higher level commands for the graphics processor of the data processing system may comprise API (e.g. job or draw) calls for the graphics processor of the data processing system.

Converting the lower level control data suitable for use by the target graphics processor into the higher level commands for the graphics processor of the data processing system may also be performed in any desired and suitable way. For example, converting the lower level control data suitable for use by the target graphics processor into higher level commands for the graphics processor of the data processing system may comprise remapping (e.g. job or draw call) descriptors for the target graphics processor to API (e.g. job or draw) calls for the graphics processor of the data processing system.

Converting the higher level commands for the graphics processor of the data processing system into the lower level control data for the graphics processor of the data processing system may also be performed in any desired and suitable way. For example, converting the higher level commands for the graphics processor of the data processing system into the lower level control data for the graphics processor of the data processing system may comprise mapping API (e.g. job or draw) calls for the graphics processor of the data processing system to (e.g. job or draw call) descriptors for the graphics processor of the data processing system.

Converting the higher level commands for the graphics processor of the data processing system into the lower level control data for the graphics processor of the data processing system may also be performed in or by any desired and suitable part of the data processing system. For example, a driver for the graphics processor of the data processing system may perform this process. These embodiments can avoid the need to replace the driver for the graphics processor of the data processing system.

In embodiments, the target graphics processor may comprise programmable processing (e.g. shader) circuitry. These embodiments may further comprise converting higher level program expressions intended for the target graphics processor into lower level instructions suitable for use by the target graphics processor. Embodiments may then comprise converting the lower level instructions suitable for use by the target graphics processor into lower level instructions for the graphics processor of the data processing system. Embodiments may then comprise causing the graphics processor of the data processing system to generate the output using the lower level instructions for the graphics processor of the data processing system, e.g. in conjunction with the lower level control data for the graphics processor of the data processing system.

The higher level program expressions intended for the target graphics processor can take any desired and suitable form. For example, the higher level program expressions may comprise program expressions for one or more (e.g. shader) programs intended for the target graphics processor. The higher level program expressions for the target graphics processor may be written in any desired and suitable (e.g. shader) programming language, such as GLSL, HLSL, OpenCL, etc. The higher level program expressions may indicate any desired programming functions defined in the relevant language standards (specifications).

The lower level instructions suitable for use by the target graphics processor can also take any desired and suitable form that can be interpreted and followed by the target graphics processor. For example, the lower level instructions suitable for use by the target graphics processor may comprise binary code to be followed by the target graphics processor. The lower level instructions suitable for use by the target graphics processor may comprise instructions which are specified in the instruction set specification for the target graphics processor.

The lower level instructions for the graphics processor of the data processing system can also take any desired and suitable form that can be interpreted and followed by the graphics processor of the data processing system. For example, the lower level instructions for the graphics processor of the data processing system may comprise binary code to be followed by the graphics processor of the data processing system. The lower level instructions for the graphics processor of the data processing system may comprise instructions which are specified in the instruction set specification for the graphics processor of the data processing system.

Converting the higher level program expressions intended for the target graphics processor into the lower level instructions suitable for use by the target graphics processor may be performed in any desired and suitable way. For example, converting the higher level program expressions intended for the target graphics processor into the lower level instructions suitable for use by the target graphics processor may comprise compiling the higher level program expressions into binary code suitable for use by the target graphics processor.

It should be noted here that references to "program expressions" herein may refer to language constructions that are to be compiled to graphics processor binary code (i.e. are to be expressed in hardware micro-instructions). Such language constructions may, depending on the language in question, be referred to as "expressions", "statements", etc. For convenience, the term "expressions" will be used herein, but this is intended to encompass all equivalent language constructions such as "statements" in GLSL. "Instructions" correspondingly refers to the actual hardware instructions (code) that are emitted to perform an "expression".

Converting the higher level program expressions intended for the target graphics processor into the lower level instructions suitable for use by the target graphics processor may also be performed in or by any desired and suitable part of the data processing system. For example, a compiler (e.g. of a driver) for the target graphics processor may perform this process. These embodiments can accordingly avoid the need to replace the compiler (and, e.g., driver) for the target graphics processor.

Converting the lower level instructions suitable for use by the target graphics processor into the lower level instructions for the graphics processor of the data processing system may also be performed in any desired and suitable way. For example, embodiments may comprise converting the lower level instructions suitable for use by the target graphics processor into higher level program expressions for the graphics processor of the data processing system. Embodiments may then comprise converting the higher level program expressions for the graphics processor of the data processing system into the lower level instructions for the graphics processor of the data processing system.

Converting the lower level instructions suitable for use by the target graphics processor into the higher level program expressions for the graphics processor of the data processing system may be performed in any desired and suitable way. For example, converting the lower level instructions suitable for use by the target graphics processor into the higher level program expressions for the graphics processor of the data processing system may comprise decompiling or translating binary code for the target graphics processor into (e.g. functionally equivalent) higher level program expressions for the graphics processor of the data processing system.

The higher level program expressions for the graphics processor of the data processing system can take any desired and suitable form. For example, the higher level program expressions for the graphics processor of the data processing system may comprise program expressions for one or more (e.g. shader) programs for the graphics processor of the data processing system. The higher level program expressions for the graphics processor of the data processing system may be written in any desired and suitable language, such as GLSL, HLSL, OpenCL, C/C++. In some embodiments, the higher level program expressions for the graphics processor of the data processing system are written in the same programming language as the higher level program expressions for the target graphics processor. In other embodiments, the higher level program expressions for the graphics processor of the data processing system are written in one or more different programming languages to the higher level program expressions intended for the target graphics processor.

Converting the higher level program expressions for the graphics processor of the data processing system into the lower level instructions for the graphics processor of the data processing system may be performed in any desired and suitable way. For example, converting the higher level program expressions for the graphics processor of the data processing system into the lower level instructions for the graphics processor of the data processing system may comprise compiling the program expressions for the graphics processor of the data processing system into binary code for the graphics processor of the data processing system.

Converting the higher level program expressions intended for the graphics processor of the data processing system into the lower level instructions suitable for use by the graphics processor of the data processing system may also be performed in or by any desired and suitable part of the data processing system. For example, a compiler (e.g. of a driver) for the graphics processor of the data processing system may perform this process. These embodiments can accordingly avoid the need to replace the compiler (and e.g. driver) for the graphics processor of the data processing system.

The higher level commands and/or higher level program expressions may correspond to any desired and suitable processing operations, such as graphics processing operations, that a target graphics processor may be desired to perform. The higher level commands and/or higher level program expressions may, for example, implement a processing pipeline (e.g. graphics processing pipeline). Thus, the processing operations may be carried out in a pipelined fashion, with one or more pipeline stages operating on input data to generate the desired (e.g. render) output, e.g. a graphics texture or frame. Plural stages of the processing pipeline may share processing circuitry, or they may each be distinct processing units. A given higher level command (e.g. API call) may use some or all of the processing stages of the processing pipeline.

The processing pipeline may comprise one or more substantially fixed-function processing stages, which comprise dedicated processing circuitry configured to perform particular processing operations to generate the desired data. For example, the processing pipeline may include one or more of a rasterisation stage, an early Z (depth) and/or stencil test stage, a late Z (depth) and/or stencil test stage, and a downsampling (multisample resolve) stage. A fixed-function processing stage may perform processing operations on a set of input data to generate a desired set of output data for processing by the rest of the pipeline and/or for output. Thus, the one or more fixed-function processing stages may be configured to implement one or more particular data processing operations, and the target graphics processor and/or graphics processor of the data processing system may comprise any desired and suitable (e.g. dedicated) hardware (processing circuitry) configured for this purpose.

The processing pipeline may also or instead include one or more programmable processing stages, such as programmable shading stages ("shaders"), which execute (e.g. shader) programs to perform processing operations to generate the desired data. For example, the processing pipeline may include one or more of a vertex shader, a geometry shader, and a fragment (pixel) shader. A programmable processing stage may execute (e.g. shader) programs on a set of input data to generate a set of output data for processing by the rest of the pipeline and/or for output. Thus, the one or more programmable processing stages may implement one or more (e.g. shader) programs, and the target graphics processor and/or graphics processor of the data processing system may comprise any desired and suitable programmable processing circuitry configured for this purpose.

In some embodiments, it may not be desired or necessary to generate "bit exact" outputs when replicating the operation of the target graphics processor on the data processing system. In these embodiments, it may however still be desired to be "cycle accurate" (or at least substantially "cycle accurate") when replicating the operation of the target graphics processor on the data processing system, for example with the relative timings of operations being such that the various processing elements (processors, controllers, etc.) of an overall target system interact appropriately. This may be the case, for example, where the target graphics processor forms part of an overall target system, such as a system on chip (SoC), and the overall target system, rather than the target graphics processor per se, is the main focus of the tests being performed.

In other embodiments, it may be desired to generate one or more "bit exact" outputs when replicating the operation of the target graphics processor on the data processing system. In these other embodiments, it may not however be desired or necessary to be "cycle accurate" when replicating the operation of the target graphics processor on the data processing system, for example since the target graphics processor does not form part of an overall target system. This may be the case, for example, where the target graphics processor (including its driver and/or compiler) is the main focus of the tests being performed.

Thus, in some embodiments, the graphics processor of the data processing system may be configured to operate at a different (e.g. higher or lower) precision than the target graphics processor, e.g. data values processed/generated by those graphics processors may not have the same format. However, in other embodiments, the graphics processor of the data processing system may be configured to operate at the same precision as the target graphics processor, e.g. data values processed/generated by those graphics processors may have the same data format.

In some embodiments, a central processor of the data processing system may still be used, at least in part (e.g. for one or more outputs, or parts thereof, that require a particular precision and/or a particular processing order), when replicating the operation of the target graphics processor on the data processing system.

In these embodiments, the central processor of the data processing system may be configured to operate at substantially the same precision as the target graphics processor when replicating the operation of the target graphics processor on the data processing system, e.g. data values processed/generated by those processors can have the same data format. This can, for example, allow one or more "bit exact" outputs to be generated by the central processor of the data processing system when replicating the operation of the target graphics processor on the data processing system, e.g. where the graphics processor of the data processing system is configured to operate at a different (e.g. higher or lower) precision than the target graphics processor and thus may not be able to generate (e.g. in a sufficiently guaranteed manner) the desired "bit-exact" results.

In embodiments, the central processor of the data processing system may also or instead be configured to generate one or more outputs by executing execution threads in a particular execution order when replicating the operation of the target graphics processor on the data processing system, e.g. where the graphics processor of the data processing system is configured to execute threads in a (massively) parallel manner and thus may not be able to execute (e.g. in a sufficiently guaranteed manner) the desired execution threads in a particular (e.g. sequential) execution order. A particular execution order may, for example, be desired and used when replicating an (e.g. blending) operation in which resource (e.g. pixel) data is accessed and/or operated on in a particular (e.g. blending) order. (An alternative approach to using the central processor of the data processing system in this way may be to "force" the graphics processor of the data processing system to execute execution threads in a particular execution order, e.g. by implementing resource locking between threads. However, this can be extremely cumbersome and inefficient to achieve using graphics processors, which tend to execute large numbers (e.g. thousands) of threads that may be competing for access to a data resource (e.g. a buffer, such as a tile buffer)).

These embodiments that make use of the central processor of the data processing system when replicating the operation of the target graphics processor may still comprise converting higher level commands intended for the target graphics processor into lower level control data suitable for use by the target graphics processor (e.g. in a manner as discussed above). However, these embodiments may then comprise converting lower level control data suitable for use by the target graphics processor into lower level control data for the central processor of the data processing system (e.g. as well as converting lower level control data suitable for use by the target graphics processor into lower level control data for the graphics processor of the data processing system). Embodiments may then comprise causing the central processor of the data processing system to generate a (e.g. partial) output using the lower level control data for the central processor of the data processing system. Embodiments may then comprise combining the (e.g. partial) output of the central processor of the data processing system with a (e.g. partial) output of the graphics processor of the data processing system to generate a combined output.

In embodiments in which the graphics processor of the data processing system and central processor of the data processing system are each used to generate one or more (e.g. partial) outputs, the one or more (e.g. partial) outputs of the graphics processor of the data processing system may be generated before the one or more (e.g. partial) outputs of the central processor of the data processing system, or vice versa, for example so as to try to avoid switching between using the graphics processor of the data processing system and central processor of the data processing system when replicating the operation of the target graphics processor on the data processing system. This in turn can reduce the consumption of data processing resources of the data processing system and increase the efficiency of the data processing system when replicating the operation of the target graphics processor on the data processing system.

The lower level control data for the central processor of the data processing system can take any desired and suitable form that can be interpreted by the central processor of the data processing system. For example, the lower level control data may comprise an indication of the settings and/or input/output resources (e.g. buffers) to be used by the central processor of the data processing system. In some embodiments, the lower level control data for the central processor of the data processing system may form part of the same set of lower level control data as the lower level control data for the graphics processor of the data processing system (e.g. the graphics processor and central processor of the data processing system may share a set of lower level control data).

As discussed above, in embodiments, the target graphics processor may comprise programmable processing (e.g. shader) circuitry. These embodiments may further comprise converting higher level program expressions intended for the target graphics processor into lower level instructions suitable for use by the target graphics processor (e.g. in a manner as discussed above). However, embodiments may then comprise converting lower level instructions suitable for use by the target graphics processor into lower level instructions for the central processor of the data processing system (e.g. as well as converting lower level instructions suitable for use by the target graphics processor into lower level instructions for the graphics processor of the data processing system). Embodiments may then comprise causing the central processor of the data processing system to generate the (e.g. partial) output using the lower level instructions for the central processor of the data processing system, e.g. in conjunction with the control data for the central processor of the data processing system.

The lower level instructions for the central processor of the data processing system can take any desired and suitable form that can be interpreted by the central processor of the data processing system. For example, the lower level instructions for the central processor may comprise binary code to be followed by the central processor of the data processing system.

Converting the lower level instructions suitable for use by the target graphics processor into the lower level instructions for the central processor of the data processing system may be performed in any desired and suitable way. For example, embodiments may comprise converting the lower level instructions suitable for use by the target graphics processor into higher level program expressions for the central processor of the data processing system. Embodiments may then comprise converting the higher level program expressions for the central processor of the data processing system into the lower level instructions for the central processor of the data processing system.

Converting the lower level instructions suitable for use by the target graphics processor into the higher level program expressions for the central processor of the data processing system may be performed in any desired and suitable way. For example, converting the lower level instructions suitable for use by the target graphics processor into the higher level program expressions for the central processor of the data processing system may comprise converting or translating binary code for the target graphics processor into (e.g. functionally equivalent) higher level program expressions for the central processor of the data processing system.

The higher level program expressions for the central processor of the data processing system can take any desired and suitable form. For example, the higher level program expressions for the central processor of the data processing system may comprise program expressions for one or more (e.g. shader) programs for the central processor of the data processing system. The higher level program expressions for the central processor of the data processing system may be written in any desired and suitable language, such as GLSL, HLSL, OpenCL, C/C++, etc.

Converting the higher level program expressions for the central processor of the data processing system into the lower level instructions for the central processor of the data processing system may be performed in any desired and suitable way. For example, converting the higher level program expressions for the central processor of the data processing system into the lower level instructions for the central processor of the data processing system may comprise compiling the program expressions for the central processor of the data processing system into binary code for the central processor of the data processing system.

Converting the higher level program expressions intended for the central processor of the data processing system into the lower level instructions suitable for use by the central processor of the data processing system may also be performed in or by any desired and suitable part of the data processing system. For example, a compiler (e.g. of a driver) for the central processor of the data processing system may perform this process. These embodiments can accordingly avoid the need to replace the compiler (and e.g. driver) for the central processor of the data processing system.

An output generated by replicating the operation of the target graphics processor may have a different output format to that which would have been generated by the target graphics processor. Thus, embodiments may further comprise converting or translating an output generated by replicating the operation of the target graphics processor to an output format that corresponds to an output that would be generated by the target graphics processor. This can then allow the output generated by replicating the operation of the target graphics processor to be processed (e.g. by a driver for the target graphics processor) as though it had been generated by the target graphics processor. In this way, the use of the graphics processor of the data processing system and/or central processor of the data processing system in place of the target graphics processor can be transparent to the driver for the target graphics processor.

An output generated by replicating the operation of the target graphics processor (e.g. an output generated by the graphics processor and/or central processor of the data processing system) may take any desired and suitable form. For example, the output generated by replicating the operation of the target graphics processor may comprise all or part of a render output, such as a graphics texture or frame. The output generated by replicating the operation of the target graphics processor may be exported to external, e.g. main, memory of the data processing system, for storage and/or use, such as to a texture buffer or to a frame buffer for a display.

The process of replicating the operation of the target graphics processor may also or instead be analysed so as to generate performance metrics (e.g. execution times, error metrics, etc.) for the target graphics processor and/or target data processing system. The performance metrics may be exported to external, e.g. main, memory, for storage or display. In these embodiments, the output generated by replicating the operation of the target graphics processor may still be stored and/or used, or may be discarded without being stored and/or without being used.

The target graphics processor that is being replicated on the data processing system may take any desired and suitable form. The target graphics processor may, for example, comprise a graphics processing unit (GPU) or general purpose GPU (GPGPU). The target graphics processor may, for example, form part of a target system on chip (SoC) that is being replicated on the data processing system. The target SoC may comprise any other desired and suitable data processing elements (processing circuitry) that a SoC may include, such as a central processor, display controller, memory controller, image processor, digital signal processor, etc. The target SoC that is being replicated may run an operating system, such as iOS, Android, Windows, etc. The data processing elements (processing circuitry) of the SoC, e.g. other than the target graphics processor, may be replicated on any desired and suitable part of the data processing system, e.g. on a central processor of the data processing system.

The graphics processor of the data processing system may also take any desired and suitable form. The graphics processor of the data processing system may, for example, comprise a graphics processing unit (GPU) or general purpose GPU (GPGPU). As indicated above, in some embodiments, the target graphics processor and the graphics processor of the data processing system may comprise differently configured hardware ((graphics) processing circuitry).

The processes of converting the commands, control data, program expressions, instructions, etc., described herein can be performed by or in any desired and suitable part of the data processing system. For example, these processes may be performed by a central processor of the data processing system. Thus, the data processing circuitry described herein may form part of a central processor of the data processing system. The central processor of the data processing system may take any desired and suitable form that central processors may take.

As will be appreciated, the various data processing elements (processors, controllers, etc.) of the data processing system described herein are actually operated in the technology described herein, whereas the target graphics processor (and, e.g., the target data processing system) described herein may be merely notional. However, embodiments may further comprise, subject to satisfactory replication of the operation of the target graphics processor (and, e.g., the target data processing system) described herein, physically providing and/or physically operating that target graphics processor (and, e.g., that target data processing system).

The technology described herein is applicable to any suitable form or configuration of graphics processors, such as tile-based graphics processors. Thus, the target graphics processor and processing pipeline may be a tile-based processor and pipeline, respectively.

In embodiments, the data processing system may comprise, and/or may be in communication with, one or more memories and/or memory devices that store the data described herein, and/or store software for performing the processes described herein. The system may comprise, and/or may be in communication with, a central processor, and/or with a display for displaying an (e.g. render) output (frame or image) and/or performance metrics generated as a result of replicating the operation of the target graphics processor.

The technology described herein can be implemented in any suitable system, such as a suitably configured microprocessor based system. In an embodiment, the technology described herein is implemented in a computer and/or micro-processor based system. The various functions of the technology described herein may be carried out on a single data processing platform.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (circuitry) and/or programmable hardware elements (circuitry) that can be programmed to operate in the desired manner.

The various functions, etc., of the technology described herein may be duplicated and/or carried out in parallel on a given processor. Equally, the various processing stages may share processing circuitry, etc., if desired.

Subject to any hardware for carrying out the specific functions discussed above, the data processing system, graphics processor of the data processing system, and central processor of the data processing system can otherwise include any one or more or all of the usual functional units, etc., that data processing systems, graphics processors and central processors may include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, embodiments of the technology described herein may comprise computer software specifically adapted to carry out the methods herein described when installed on one or more data processors, a computer program element comprising computer software code portions for performing the methods described herein when the program element is run on one or more data processors, and a computer program comprising code adapted to perform all the steps of a method or of the methods described herein when the program is run on a data processing system. The data processor may be a microprocessor system, a programmable FPGA (field programmable gate array), etc.

The technology described herein also extends to a computer software carrier comprising such software which when used to operate one or more processors of a data processing system causes said one or more processors to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus embodiments of the technology described herein may comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As discussed above, the technology described herein relates to arrangements in which the operation of a target graphics processor is replicated on a data processing system using a graphics processor of the data processing system.

Embodiments of the technology described herein will now be described in more detail with reference to a computer data processing system 100 as shown in FIG. 1. In this embodiment, the data processing system 100 comprises a central processor ("system CPU") 102 and a graphics processor ("system GPU") 104. In normal use, the system GPU 104, under the control of the system CPU 102, uses a graphics processing pipeline to generate rendered outputs for display.

In the following embodiments, the data processing system 100 also replicates the operation of a target data processing system under development by executing an application 106 that models the operation of that target data processing system. In the following embodiments, the target data processing system comprises a target graphics processor, and the data processing system 100 makes use of the system GPU 104 to assist in replicating the operation of that target graphics processor. In this way, the processing time and resources that are consumed when replicating the operation of the data processing system can be significantly lower than in typical arrangements in which the operation of the target graphics processor is replicated using the system CPU 102 alone.

Figure 2:
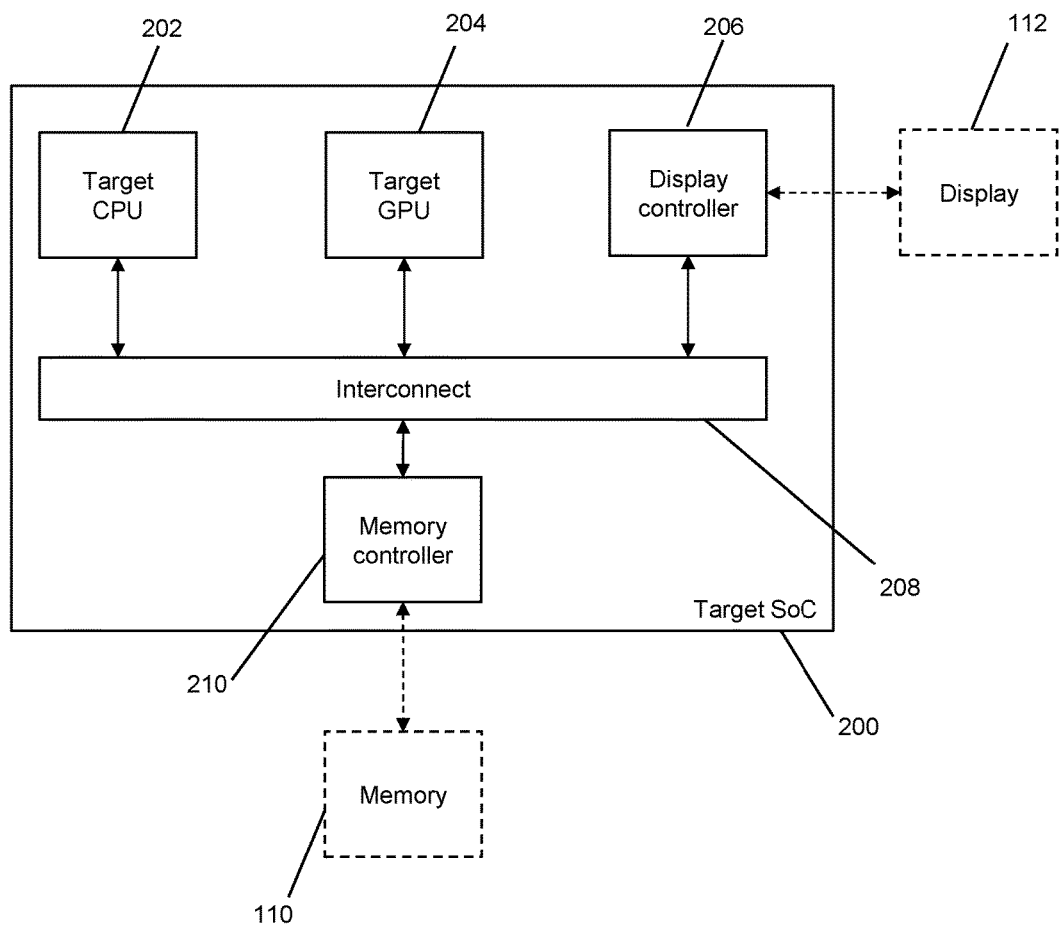
FIG. 2 shows schematically a system-on-chip to be replicated in the manner of the technology described herein.

FIG. 2 shows an embodiment of a target data processing system that can be replicated on the data processing system 100 of FIG. 1. In this embodiment, the target data processing system comprises a system on chip ("target SoC") 200 that is executing an operating system, such as iOS, Android or Windows. The target SoC 200 comprises a central processor ("target CPU") 202, a graphics processor ("target GPU") 204, a display controller 206, an interconnect 208 and a memory controller 210.

When the operation of the target SoC 200 is replicated, the target CPU 202, target GPU 204, and display controller 206 communicate with each other via the interconnect 208. The target CPU 202, target GPU 204, and display controller 206 also communicate with an external memory 110 via the interconnect 208 and memory controller 210. The target SoC 200 also communicates with an external display device 112 via the display controller 206.

When the operation of the target SoC 200 is replicated, the target GPU 204 uses a graphics processing pipeline to generate rendered outputs for display, and stores the rendered outputs in the external system memory 110. The display controller 206 can then read in rendered outputs stored in the external system memory 110, and use the rendered outputs to generate output frames for display on the external display device 112.

It should be noted here that the external system memory 110 and external display device 112 do not form part of the target SoC 200. Thus, when the operation of the target SoC 200 is replicated, main memory for the data processing system 100 of FIG. 1 may be used as the external system memory 110 of FIG. 2. Similarly, a display device for the data processing system 100 of FIG. 1 may be used as the external display device 112 of FIG. 2. The display device could comprise, for example, a display comprising an array of pixels, such as a computer monitor, or a printer.

Other arrangements for the target data processing system to be replicated would, of course, be possible. Furthermore, in other embodiments, the data processing system 100 may replicate the operation of a target graphics processor regardless of whether or not that target graphics processor forms part of an overall target data processing system.

Figure 3:
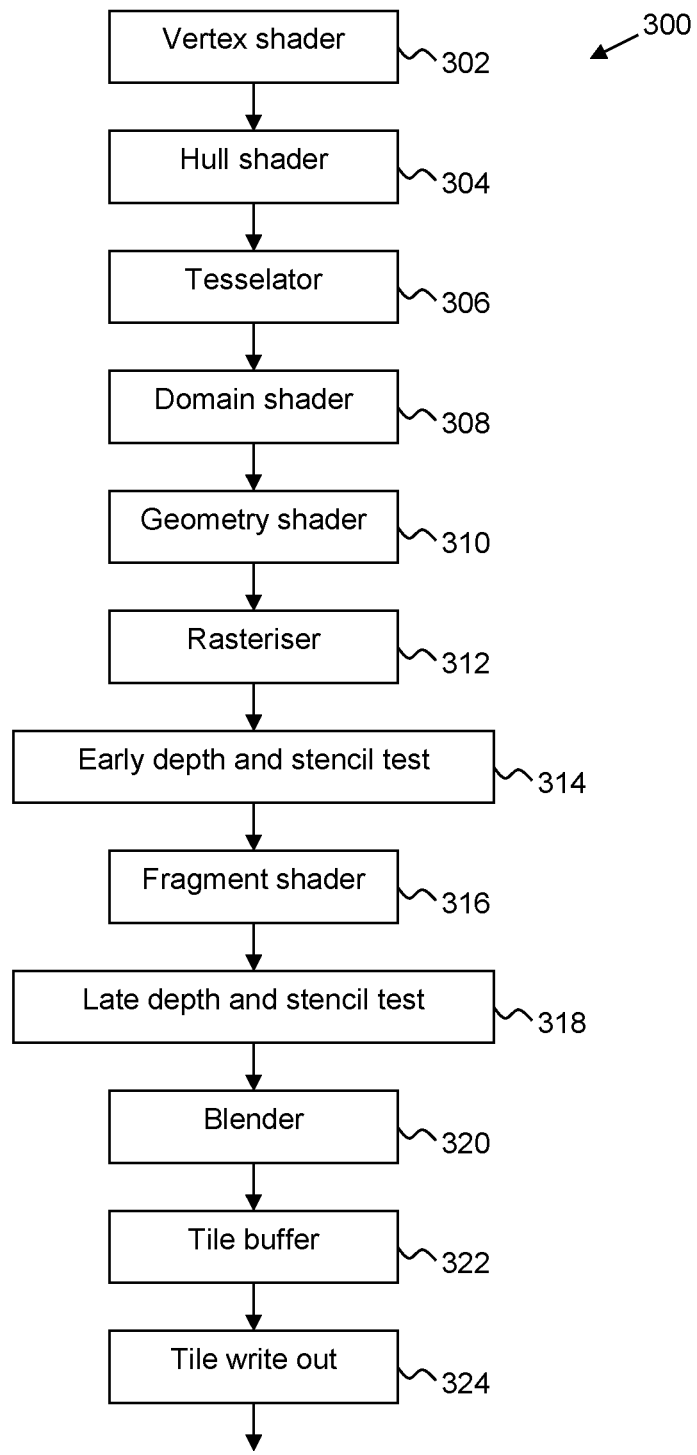
FIG. 3 shows schematically a graphics processing pipeline to be replicated in the manner of the technology described herein.

FIG. 3 shows a graphics processing pipeline 300 that can be implemented in embodiments of the technology described herein, either by the system GPU 104, by the target GPU 204, or by both the system GPU 104 and target GPU 204.

In the embodiment of FIG. 3, the graphics processing pipeline 300 is a tile-based renderer and will thus produce tiles of a render output data array, such as a graphics texture or frame to be generated. In tile-based rendering, rather than the entire render output, e.g., graphics texture or frame for display, effectively being processed in one go, the render output is divided into a plurality of smaller sub-regions, usually referred to as "tiles". Each tile is rendered separately (e.g. one-after-another), and the rendered tiles are then recombined to provide the complete render output, e.g., graphics texture or frame for display. The render output can be divided into regularly-sized and shaped tiles (such as squares or rectangles), but this is not essential.

In this embodiment, when a computer graphics image is to be generated, it is defined as a series of primitives (polygons), which primitives are then divided (rasterised) into graphics fragments for graphics rendering in turn. During a graphics rendering operation, the renderer modifies the, e.g., colour (red, green and blue, RGB) and transparency (alpha, a), data associated with each fragment so that the fragments can be displayed correctly. Once the fragments have fully traversed the renderer, then their associated data values are stored in memory, ready for output, e.g. for display. The render output data array may be an output frame intended for display on a display device, such as a screen or printer, but may also, for example, comprise intermediate data intended for use in later rendering passes (also known as a "render to texture" output), etc.

FIG. 3 shows the main elements and pipeline stages of the graphics processing pipeline 300 that are relevant to the operation of the present embodiment. As will be appreciated by those skilled in the art there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline 300 as shown in FIG. 3 may be implemented as desired and will accordingly comprise, e.g., appropriate circuitry and/or processing logic, etc., for performing the desired operation and functions.

As is shown in FIG. 3, the graphics processing pipeline 300 includes a number of stages, including vertex shader 302, a hull shader 304, a tesselator 306, a domain shader 308, a geometry shader 310, a rasterisation stage 312, an early Z (depth) and stencil test stage 314, a renderer in the form of a fragment shading stage 216, a late Z (depth) and stencil test stage 318, a blending stage 320, a tile buffer 322 and a downsampling and writeout (multisample resolve) stage 324.

The vertex shader 302 takes input data values associated with the vertices, etc., defined for the output to be generated, and processes those data values to generate a set of corresponding "vertex shaded" output data values for use by subsequent stages of the graphics processing pipeline 300.

The vertex shading, for example, modifies the input data to take account of the effect of lighting in the image to be rendered.

The hull shader 304 performs operations on sets of patch control points and generates additional data known as patch constants, the tessellation stage 306 subdivides geometry to create higher-order representations of the hull, the domain shader 308 performs operations on vertices output by the tessellation stage (similar to a vertex shader), and the geometry shader 310 processes entire primitives such as a triangles, points or lines. These stages together with the vertex shader 302 effectively perform all the desired fragment frontend operations, such as transformation and lighting operations, and primitive setup, to setup the primitives to be rendered, in response to control data provided to the graphics processing pipeline 300.

The rasterisation stage 312 of the graphics processing pipeline 300 operates to rasterise the primitives making up the render output (e.g. the graphics texture or the image to be generated) into individual graphics fragments for processing. To do this, the rasteriser 312 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The early Z/stencil stage 314 performs a Z (depth) test on fragments it receives from the rasteriser 312, to see if any fragments can be discarded (culled) at this stage. To do this, it compares the depth values of (associated with) fragments issuing from the rasteriser 312 with the depth values of fragments that have already been rendered (these depth values are stored in a depth (Z) buffer that is part of the tile buffer 322) to determine whether the new fragments will be occluded by fragments that have already been rendered (or not). At the same time, an early stencil test is carried out. Fragments that pass the early Z and stencil test stage 314 are then sent to the fragment shading stage 316.

The fragment shading stage 316 performs the appropriate fragment processing operations on the fragments that pass the early Z and stencil tests, so as to process the fragments to generate the appropriate rendered fragment data. This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 316 is in the form of a programmable fragment shader.

There is then a "late" fragment Z and stencil test stage 318, which carries out, inter alia, an end of pipeline depth test on the shaded fragments to determine whether a rendered fragment will actually be seen in the final texture or image. This depth test uses the Z-buffer value for the fragment's position stored in the Z-buffer in the tile buffer 322 to determine whether the fragment data for the new fragments should replace the fragment data of the fragments that have already been rendered, by comparing the depth values of (associated with) fragments issuing from the fragment shading stage 316 with the depth values of fragments that have already been rendered (as stored in the depth buffer). This late fragment depth and stencil test stage 318 also carries out any desired "late" alpha and/or stencil tests on the fragments.

The fragments that pass the late fragment test stage 318 are then subjected to, if required, any desired blending operations with fragments already stored in the tile buffer 322 in the blender 320. Any other remaining desired operations on the fragments, such as dither, etc. (not shown) are also carried out at this stage.

Finally, the (blended) output fragment data (values) are written to the tile buffer 322 from where they can, for example, be output to a texture buffer or a frame buffer. The depth value for an output fragment is also written appropriately to a Z-buffer within the tile buffer 322.

The tile buffer 322 will store colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer 322 stores its fragment data as 32×32 arrays (i.e. corresponding to a 32×32 array of sample positions in the output to be generated, e.g., in the graphics texture or image to be displayed). Each 32×32 data position array in the tile buffer can accordingly correspond to (and will "natively" support) a 16×16 texel or pixel "tile" of, e.g., the graphics texture or frame to be displayed, at 4× anti-aliasing (i.e. when taking 4 samples per texel or pixel).

The tile buffer 322 is provided as part of RAM that is located on (local to) the graphics processing pipeline (graphics processor chip). The data from the tile buffer 322 is input to a downsampling (multisample resolve) write out unit 324, and thence output (written back) to an external memory output buffer, such as a texture buffer or a frame buffer for a display device.

The downsampling and writeout unit 324 downsamples the fragment data stored in the tile buffer 322 to the appropriate resolution for the output buffer (device), i.e. such that an array of pixel data corresponding to the pixels of the output device is generated, to generate output values (pixels) for output to the output buffer.

Once a tile of the render output has been processed and its data exported to memory (e.g. to a texture buffer or frame buffer in memory) for storage, the next tile is then processed, and so on, until sufficient tiles have been processed to generate the entire render output (e.g. graphics texture or frame (image) to be displayed). The process is then repeated for the next render output (e.g. graphics texture or frame) and so on.

In general, in order to use the graphics processing pipeline 300, higher level "commands" in the form of graphics API (Application Programming Interface) calls are generated by an application that requires a graphics output (e.g. to generate a graphics texture or a frame). The graphics API calls are interpreted by a driver for the graphics processor in question, and a set of lower level "control data" is generated in the form of job or draw call descriptors for the graphics processor in question. Each job or draw call can use one or more of the stages of the graphics processing pipeline.

As can be seen from FIG. 3, the graphics processing pipeline 300 can include a number of substantially fixed-function stages, for example the rasteriser 312, the early Z/stencil test stage 314, the late Z/stencil test stage 318, and the downsampling (multisample resolve) stage 324. These fixed-function stages perform respective data processing operations that have one or more input variables and generate one or more output variables. As can also be seen from FIG. 3, the graphics processing pipeline 300 can include a number of programmable processing or "shader" stages, for example the vertex shader 302, hull shader 304, domain shader 308, geometry shader 310, and the fragment shader 316. These programmable shader stages execute respective shader programs that have one or more input variables and generate one or more output variables. To do this, "program expressions" are initially provided in a high level shader programming language, such as GLSL, HLSL, OpenCL, etc. These shader program expressions are then translated by a shader language compiler to lower level binary code for the graphics processor in question. This may include the creation of one or more intermediate representations of the program within the compiler. The compiler may, e.g., be part of a driver for the graphics processor in question, with there being a special API call to cause the compiler to run. The compiler execution can thus be seen as being part of the job or draw call preparation done by the driver in response to graphics API calls.

Other arrangements for the graphics processing pipeline 300 would, of course, be possible. Indeed, in embodiments, the graphics processing pipeline and/or processing circuitry used by the system GPU 104 can differ significantly from the graphics processing pipeline and/or processing circuitry used by the target GPU 204.

The above describes various features of a data processing system and a target graphics processor to be replicated. Further details of replicating the operation of a target graphics processor on a data processing system will now be described with reference to FIGS. 4-9.

Figure 4:
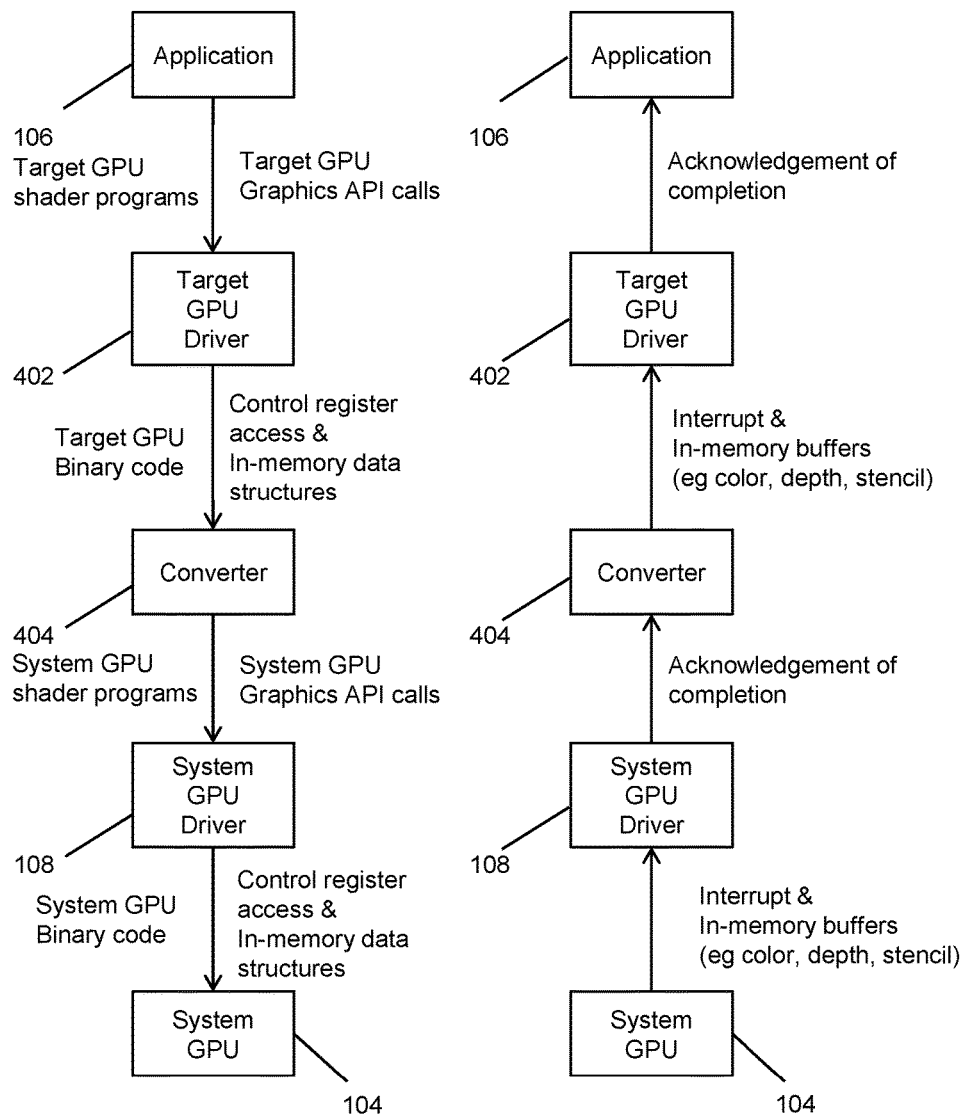
FIG. 4 shows a method of replicating the operation of a target graphics processor on a data processing system according to an embodiment of the technology described herein.

FIG. 4 shows a first embodiment of a method of replicating the operation of the target GPU 204 of FIG. 2 on the data processing system 100 of FIG. 1.

In this embodiment, the application 106 running on the system CPU 102 provides higher level program expressions for shader programs to be executed by the target GPU 204 when generating graphics outputs. The application 106 also issues higher level commands in the form of graphics API calls that are intended for the target GPU 204 to generate a particular graphics output.

The system CPU 102 also runs a driver 402 for the target GPU 204. The driver 402 for the target GPU 204 comprises a compiler that converts the higher level program expressions intended for the target GPU 204 into lower level instructions in the form of binary code that can be followed by the shaders of the target GPU 204 when generating graphics outputs. The driver 402 for the target GPU 204 also converts the higher level commands intended for the target GPU 204 into lower level control data (settings and input/output resources) in the form of register access and in-memory data structures (buffers) that can be used by the target GPU 204 when generating a particular graphics output. In this embodiment, since the driver 402 for the target GPU 204 is used, the target GPU 204 can be comprehensively tested.

The system CPU 102 also runs a converter 404 that converts the lower level instructions suitable for the target GPU 204 back into higher level program expressions for shader programs to be executed by the system GPU 104 when generating graphics outputs. The converter 404 also converts the lower level control data suitable for the target GPU 204 back into higher level commands in the form of graphics API calls that are intended for the system GPU 104 when generating a particular graphics output.

Figure 5:
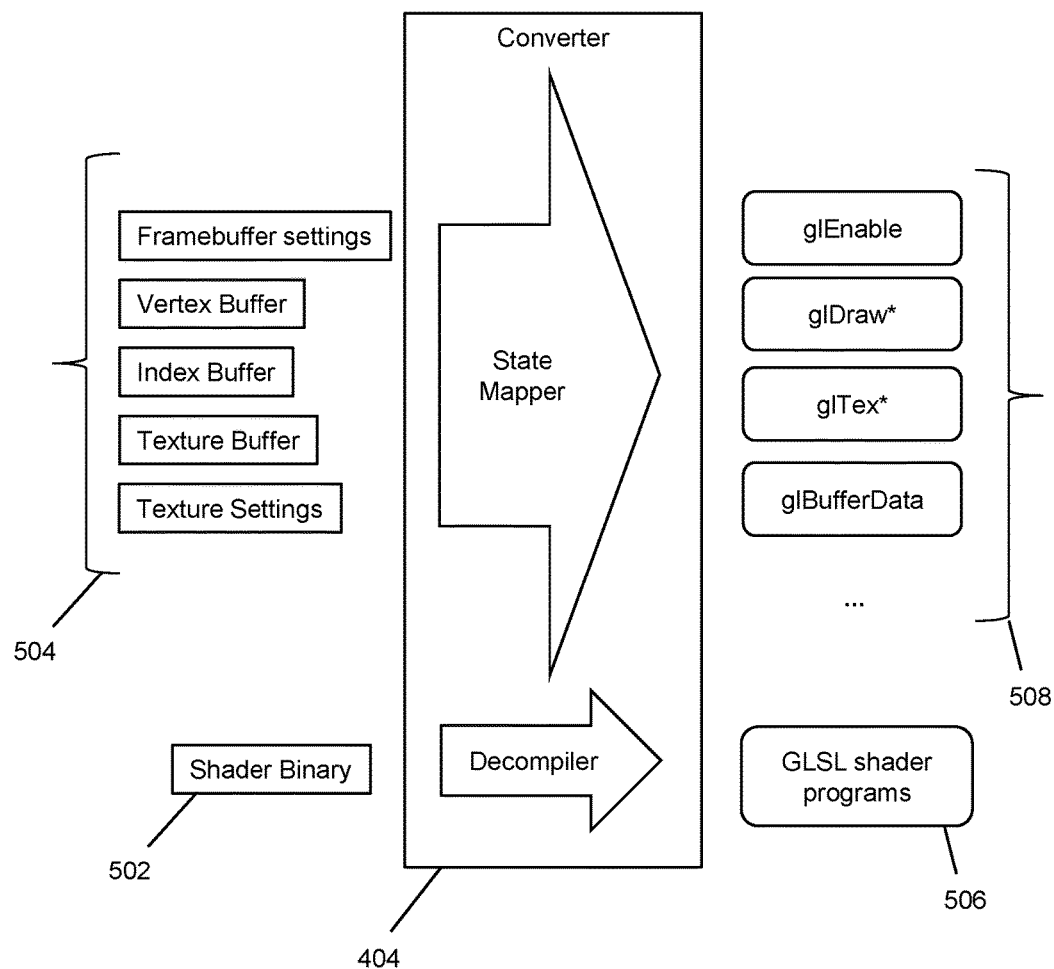
FIG. 5 shows a method of converting lower level control data and instructions for a target graphics processor into higher level commands and program expressions for a graphics processor of a data processing system according to an embodiment of the technology described herein.

FIG. 5 shows in more detail a method of converting lower level control data and instructions for the target GPU 204 into higher level commands and program expressions for the system GPU 104. In this embodiment, the converter 404 comprises a decompiler that decompiles the lower level instructions in the form of shader binary 502 suitable for the target GPU 204 back into functionally equivalent higher level program expressions in the form of GLSL shader programs 506 to be executed by the system GPU 104. The converter 404 also comprises a state mapper that maps control data 504, such as framebuffer settings, vertex buffer data, index buffer data, texture buffer data, and texture settings, into equivalent higher level commands 508 comprising GLSL functions, such as glEnable, glDraw*, glTex* and glBufferData.

Referring again the FIG. 4, the system CPU 102 also runs the driver 108 for the system GPU 104. The driver 108 for the system GPU 104 comprises a compiler that converts the higher level program expressions for the system GPU 104 into lower level instructions in the form of binary code that can be followed by the shaders of the system GPU 104 when generating graphics outputs. The driver 108 for the system GPU 104 also converts the higher level commands for the system GPU 104 into lower level control data (settings and input/output resources) in the form of register access and in-memory data structures (buffers) that can be used by the system GPU 104 when generating a particular graphics output.

The system GPU 104 can then follow the higher level commands and program expressions which were intended for the target GPU 204 to generate the desired graphics output using the lower level control data and instructions provided by the driver 108 for the system GPU 104. Since the system GPU 104, rather than the system CPU 102, is used to generate the desired graphics output, the process of replicating the operation of the target GPU 204 can be more efficient.

Once the desired graphics output has been generated, the generated output (in-memory buffers, such as the colour, depth and/or stencil buffer) and an interrupt are provided to the driver 108 for the system GPU 104. The driver 108 for the system GPU 104 then provides an acknowledgment of completion to the converter 404. The converter then converts the generated output into an output format for an output (in-memory buffers, such as the colour, depth and/or stencil buffer) as would be generated by the target GPU 204, and provides the converted output and an interrupt to the driver 402 for the target GPU 204.

Figure 6:
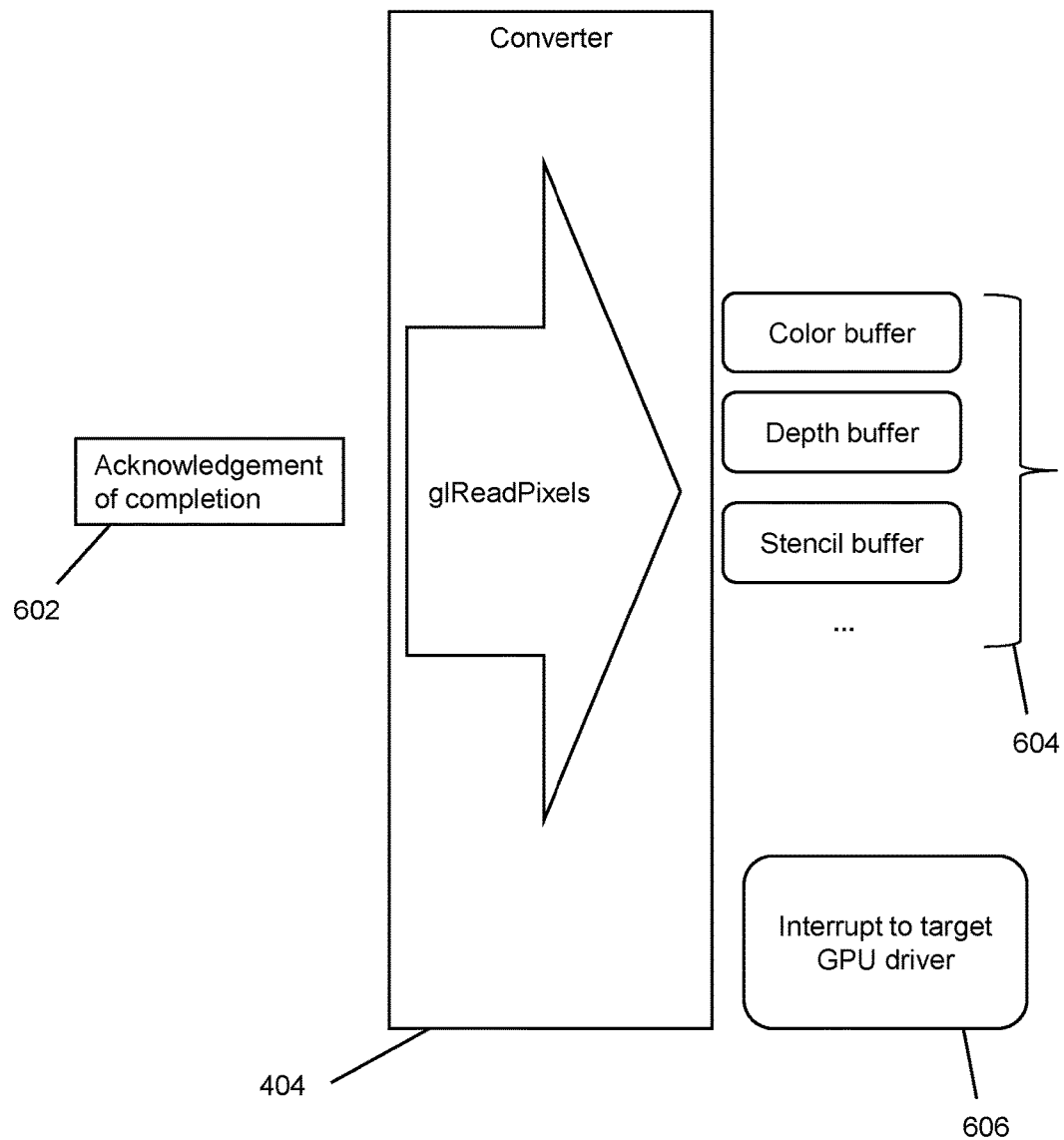
FIG. 6 shows a method of converting an output generated by a graphics processor of a data processing system into an output format corresponding to an output generated by a target graphics processor according to an embodiment of the technology described herein.

FIG. 6 shows in more detail a method of converting an output generated by the system GPU 104 into an output format corresponding to an output generated by the target GPU 204. In this embodiment, the converter 404 receives the acknowledgment of completion 602 from the system GPU 104. The converter 404 then implements a glReadPixels( ) function and generates a converted output 604, such as colour buffer data, depth buffer data, and/or stencil buffer data, that is in a format suitable for the target GPU 204. The converter 404 then provides the converted output 604 and an interrupt 606 to the driver 402 for the target GPU 204. In this embodiment, since a converted output and interrupt is provided to the driver 402 for the target GPU 204, the use of the system GPU 104 in place of the target GPU 204 is transparent to the driver 402 for the target GPU 204.

Referring again the FIG. 4, the driver 402 for the target GPU 204 then provides an acknowledgment of completion to the application 106.

Figure 7:
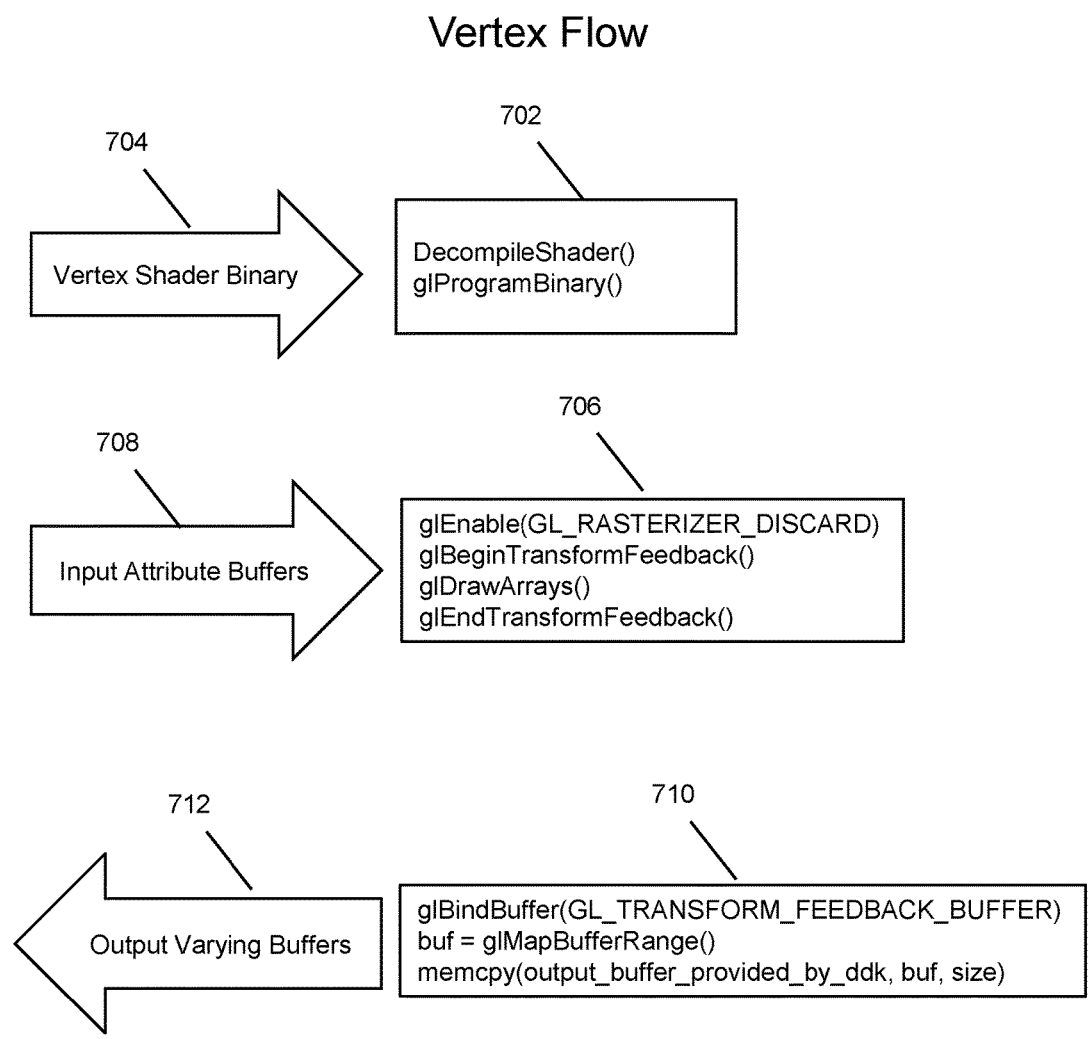
FIG. 7 shows a method of replicating vertex shader operations according to an embodiment of the technology described herein.

FIG. 7 shows in more detail a method of replicating vertex shader operations. In this embodiment, a first step 702 comprises a DecompileShader( ) function that decompiles lower level vertex shader binary 704 suitable for the target GPU 204 to higher level program expressions (in this case GLSL source code) for the system GPU 104, followed by a glProgramBinary( ) function that loads a program object with lower level instructions in the form of vertex shader binary for the system GPU 104. Then, a second step 706 comprises a glEnable(GL_RASTERIZER_DISCARD) function that discards all primitives before rasterisation (since, in this embodiment, a separate fragment shading job is to be performed by the system GPU 104), followed by a glBeginTransformFeedback( ) function that begins a transform feedback mode in which the values of varying variables written by the vertex shader are captured, followed by a glDrawArrays( ) function that constructs primitives based on lower level control data in the form of input attribute buffers 708, followed by a glEndTransformFeedback( ) function that ends the transform feedback mode. As indicated in FIG. 5, other glDraw* functions, such as glDrawArraysInstanced( ), glDrawElements( ), glDrawElementsInstanced( ) and glDrawRangeElements( ) may be used instead of glDrawArrays( ) as desired. Vertex shader operations can then be performed using the vertex shader binary 704 and input attribute buffers 708 to generate varying data. Then, a third step 710 comprises a glBindBuffer(GL_TRANSFORM_FEEDBACK_BUFFER) function that binds a buffer object to the transform feedback buffer, followed by a buf=glMapBufferRange( ) function that maps the varying data from the buffer object to address space, followed by a memcpy(output_buffer_provided_by_ddk, buf, size) function that copies the varying data to an output varying buffer 712.

Figure 8:
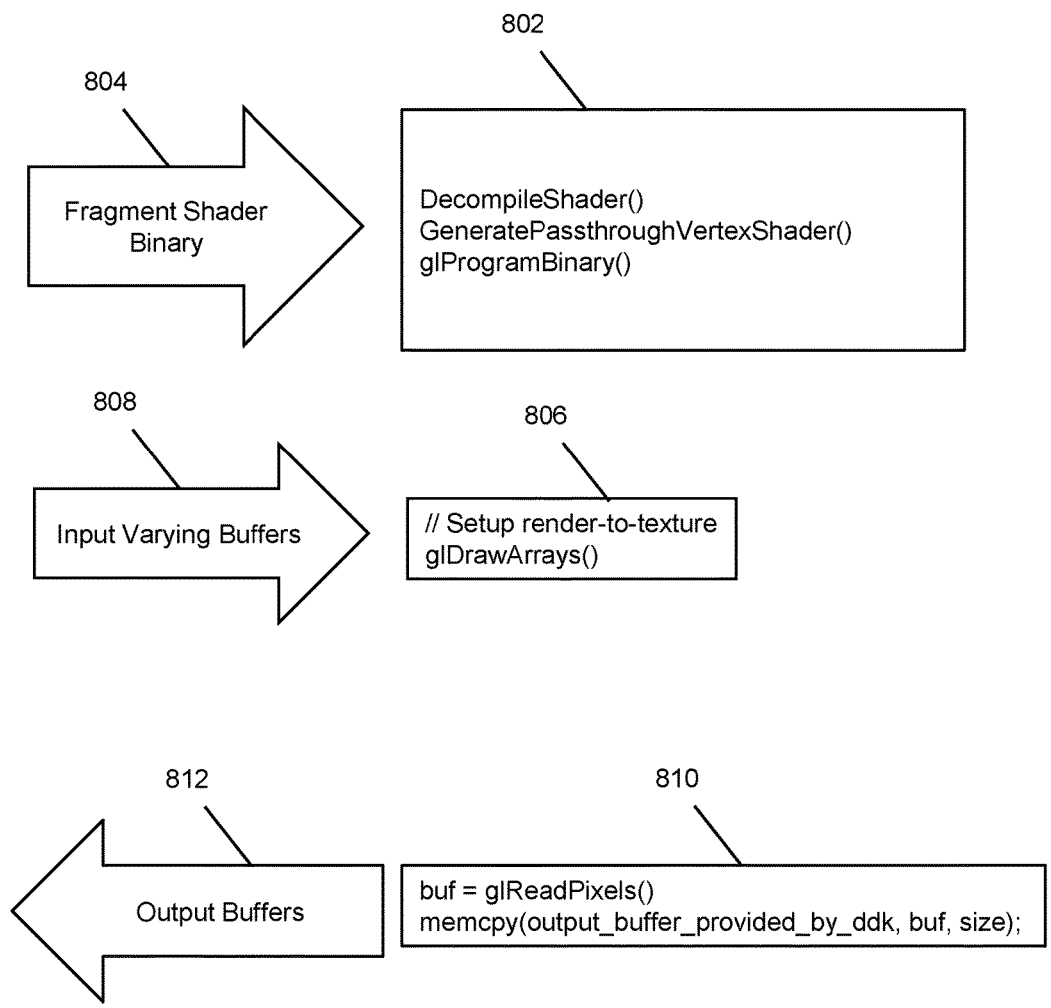
FIG. 8 shows a method of replicating fragment shader operations according to an embodiment of the technology described herein.

FIG. 8 shows in more detail a method of replicating fragment shader operations. In this embodiment, a first step 802 comprises a DecompileShader( ) function that decompiles lower level fragment shader binary 804 suitable for the target GPU 204 to higher level program expressions (in this case GLSL source code) for the system GPU 104, followed by a GeneratePassthroughVertexShader( ) function that merely passes vertex data through the vertex shader to the fragment shader (since, in this embodiment, a separate vertex shading job is to be performed by the system GPU 104), followed by a glProgramBinary( ) function that loads a program object with lower level instructions in the form of fragment shader binary for the system GPU 104. Then, a second step 806 comprises render-to-texture setup processes, followed by a glDrawArrays( ) function that constructs primitives based on lower level control data in the form of input varying buffers 808. Again, as indicated in FIG. 5, other glDraw* functions, such as glDrawArraysInstanced( ), glDrawElements( ), glDrawElementsInstanced( ) and glDrawRangeElements( ), may be used instead of glDrawArrays( ), as desired. The primitives can then be rasterised to fragments and fragment shader operations can then be performed using the fragment shader binary 804 and input varying buffers 808 to generate shaded fragment data. Then, a third step 810 comprises a buf=glReadPixels( ) function that reads shaded fragment data to address space, followed by a memcpy(output_buffer_provided_by_ddk, buf, size) function that copies the shaded fragment data to an output buffer 812.

Figure 9:
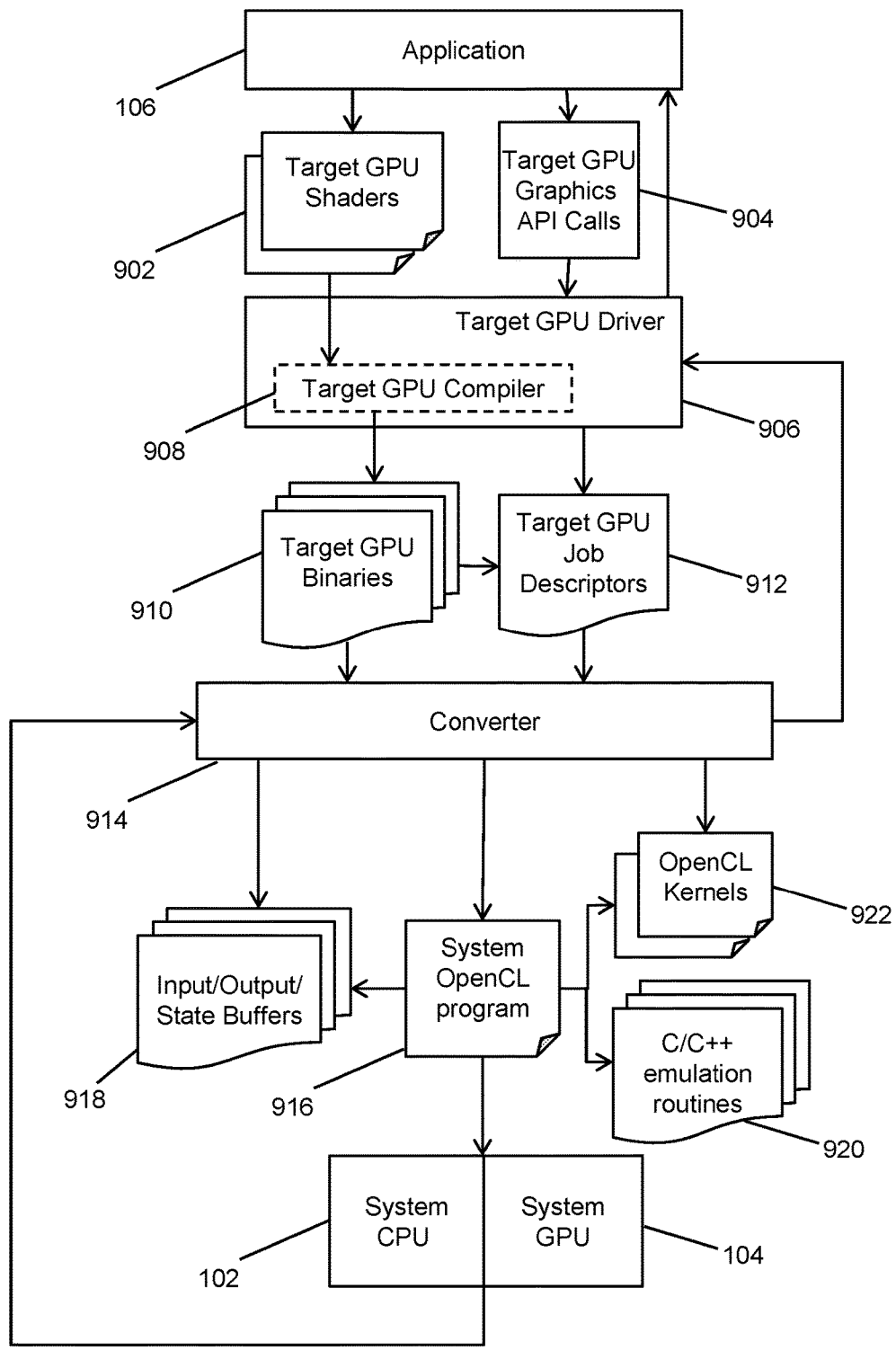
FIG. 9 shows a method of replicating the operation of a target graphics processor on a data processing system according to another embodiment of the technology described herein.

FIG. 9 shows a second embodiment of a method of replicating the operation of a target GPU on the data processing system 100 of FIG. 1.

In this embodiment, the application 106 running on the system CPU 102 provides higher level program expressions 902 for shader programs to be executed by the target GPU when generating graphics outputs. The application 106 also issues higher level commands 904 in the form of graphics API calls that are intended for the target GPU to generate a particular graphics output.

The system CPU 102 also runs a driver 906 for the target GPU. The driver 906 for the target GPU comprises a compiler 908 that converts the higher level program expressions intended for the target GPU 204 into lower level instructions 910 in the form of shader binary code that can be followed by the shaders of the target GPU when generating graphics outputs. The driver 906 for the target GPU also converts the higher level commands intended for the target GPU into lower level control data 912 in the form of job descriptors that can be used by the target GPU when generating a particular graphics output. In this embodiment, since the driver 906 for the target GPU is used, the target GPU can be comprehensively tested.

The system CPU 102 also runs a converter 914 (or "translator") that converts or translates the lower level instructions 910 suitable for the target GPU into higher level program expressions for an OpenCL program 916 to be executed by the system CPU 102 (in order to orchestrate emulation of the target GPU) and OpenCL Kernels 922 to be executed by the system GPU 104 when generating graphics outputs. The converter 914 also converts or translates the lower level control data 912 suitable for the target GPU into lower level control data 918 in the form of input/output/state buffers that are intended for used by the system CPU 102 and the system GPU 104 when generating a particular graphics output.

In this embodiment, the OpenCL program 916 includes calls to C/C++ emulation routines 920 to be executed by the system CPU 102. The OpenCL program 916 also spawns the OpenCL Kernels 922 to be executed by the system GPU 104. In this regard, in this embodiment, the system GPU 104 operates at lower precision than the target GPU whereas the system CPU 102 can operate at the same precision as the target GPU. The C/C++ emulation routines 920 accordingly allow operations that need to be performed at the higher precision in order to provide a bit-exact output, and that would otherwise be executed at too low a precision on the system GPU 104, to be executed at a sufficiently high precision on the system CPU 102. The OpenCL Kernels 922 also allow certain threads to be executed in a massively parallel manner on the system GPU 104, thereby reducing overall processing times, whereas the C/C++ emulation routines 920 allow certain other (e.g. execution order dependent) threads (e.g. for blending operations) to be performed in a suitable sequential execution order on the system CPU 102.

The system CPU 102 and system GPU 104 then each generate plural partial outputs that combine to give a desired graphics output. In this embodiment, the system CPU 102 firstly generates plural partial outputs and, once those plural partial outputs have been generated, then the system GPU 104 generates plural partial outputs. In this way, switching between the system CPU 102 and system GPU 104 when generating the desired graphics output can be reduced or avoided.

In this embodiment, since the system GPU 104 and system CPU 102, rather than just the system CPU 102, are used to generate the desired graphics output, the process of replicating the operation of the target GPU can be more efficient.

Once the desired combined graphics output has been generated, the graphics output is then provided to the converter 914. The converter 914 then converts the graphics output into an output format for an output as would be generated by the target GPU, and provides the converted output to the driver 906 for the target GPU. Since a converted output is provided to the driver 906 for the target GPU, the use of the system CPU 102 and system GPU 104 in place of the target GPU is transparent to the driver 906 for the target GPU.

In any of the above embodiments, the render outputs generated when replicating the operation of the target graphics processor 204 can be stored for later review and/or displayed on the display device 112, allowing the operation of the target graphics processor 112 to be visually assessed. Furthermore, in any of the above embodiments, performance metrics for the target graphics processor 204, such as processing times and error metrics, can be generated by monitoring and/or analysing the process of replicating the target graphics processor 112. These performance metrics can be stored for later review and/or displayed on the display device 112 for review.

It can be seen from the above that the technology described herein, in embodiments, can provide an efficient and comprehensive testing environment when replicating the operation of the target graphics processor on a data processing system, for example when compared with typical arrangements in which the operation of the target graphics processor is replicated in software on a central processor of the data processing system. For example, in some embodiments of the technology described herein, execution times for rending a frame have been achieved that are in the order of milliseconds, whereas execution times for rending a frame in typical arrangements tend to be around 5 minutes. For another example, in some embodiments of the technology described herein, execution times have been achieved that are around only 10× the execution time of the target graphics processor, whereas execution times in typical arrangements tend to be around 10000× the execution time of the target graphics processor. This can be achieved, in embodiments, by using a driver for the target graphics processor to convert higher level commands and program expressions intended for the target graphics processor into lower level control data and instructions suitable for use by the target graphics processor, then converting the lower level control data and instructions suitable for use by the target graphics processor into lower level control data and instructions for the graphics processor of the data processing system, and then causing the graphics processor of the data processing system to generate an output using the lower level control data and instructions for the graphics processor of the data processing system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of replicating the operation of a target graphics processor on a data processing system that comprises a graphics processor, the method comprising:
   converting higher level commands intended for the target graphics processor into lower level control data suitable for use by the target graphics processor;

converting the lower level control data suitable for use by the target graphics processor into lower level control data for the graphics processor of the data processing system;
causing the graphics processor of the data processing system to generate an output using the lower level control data for the graphics processor of the data processing system;
converting lower level control data suitable for use by the target graphics processor into lower level control data for a central processor of the data processing system;
causing the central processor of the data processing system to generate an output using the lower level control data for the central processor of the data processing system; and
combining the output generated by the central processor of the data processing system with the output generated by the graphics processor of the data processing system to generate a combined output;
wherein the central processor of the data processing system, when generating an output using the lower level control data for the central processor of the data processing system, performs at least one of:
operating at substantially the same precision as the target graphics processor; and
executing execution threads in a particular execution order.

2. A method as claimed in claim 1, wherein converting the higher level commands intended for the target graphics processor into the lower level control data suitable for use by the target graphics processor is performed using a driver for the target graphics processor.

3. A method as claimed in claim 1, wherein converting the lower level control data suitable for use by the target graphics processor into lower level control data for the graphics processor of the data processing system comprises:
converting the lower level control data suitable for use by the target graphics processor into higher level commands for the graphics processor of the data processing system; and
converting the higher level commands for the graphics processor of the data processing system into the lower level control data for the graphics processor of the data processing system.

4. A method as claimed in claim 3, wherein converting the higher level commands for the graphics processor of the data processing system into lower level control data for the graphics processor of the data processing system is performed using a driver for the graphics processor of the data processing system.

5. A method as claimed in claim 1, further comprising:
converting higher level program expressions intended for the target graphics processor into lower level instructions suitable for use by the target graphics processor;
converting the lower level instructions suitable for use by the target graphics processor into lower level instructions for the graphics processor of the data processing system; and
causing the graphics processor of the data processing system to generate the output using the lower level instructions for the graphics processor of the data processing system.

6. A method as claimed in claim 1, further comprising:
converting an output generated by replicating the operation of the target graphics processor into an output format that corresponds to an output that would be generated by the target graphics processor.

7. A method as claimed in claim 1, wherein the target graphics processor forms part of a target system on chip that is being replicated on the data processing system.

8. A method as claimed in claim 1, wherein the graphics processor of the data processing system comprises differently configured processing circuitry to the target graphics processor.

9. A data processing system for replicating the operation of a target graphics processor, the data processing system comprising:
a graphics processor configured to generate an output using lower level control data; and
data processing circuitry configured to:
convert higher level commands intended for the target graphics processor into lower level control data suitable for use by the target graphics processor;
convert the lower level control data suitable for use by the target graphics processor into lower level control data for the graphics processor of the data processing system;
cause the graphics processor of the data processing system to generate an output using the lower level control data for the graphics processor of the data processing system;
wherein the data processing system further comprises a central processor configured to generate an output using lower level control data; and
wherein the data processing circuitry is further configured to:
convert lower level control data suitable for use by the target graphics processor into lower level control data for the central processor of the data processing system;
cause the central processor of the data processing system to generate an output using the lower level control data for the central processor of the data processing system; and
combine the output generated by the central processor of the data processing system with the output generated by the graphics processor of the data processing system to generate a combined output;
and
wherein the data processing circuitry is further configured to:
cause the central processor of the data processing system, when the central processor is generating an output using the lower level control data for the central processor of the data processing system, to at least one of:
operate at substantially the same precision as the target graphics processor; and
execute execution threads in a particular execution order.

10. A system as claimed in claim 9, wherein the data processing circuitry is configured to convert the higher level commands intended for the target graphics processor into the lower level control data suitable for use by the target graphics processor using a driver for the target graphics processor.

11. A system as claimed in claim 9, wherein the data processing circuitry is configured to, when converting the lower level control data suitable for use by the target graphics processor into lower level control data for the graphics processor of the data processing system:
convert the lower level control data suitable for use by the target graphics processor into higher level commands for the graphics processor of the data processing system; and convert the higher level commands for the graphics processor of the data processing system into the lower level control data for the graphics processor of the data processing system.

12. A system as claimed in claim 11, wherein the data processing circuitry is configured to convert the higher level commands for the graphics processor of the data processing system into the lower level control data for the graphics processor of the data processing system using a driver for the graphics processor of the data processing system.

13. A system as claimed in claim 9, wherein the data processing circuitry is configured to:
- convert higher level program expressions intended for the target graphics processor into lower level instructions suitable for use by the target graphics processor;
- convert the lower level instructions suitable for use by the target graphics processor into lower level instructions for the graphics processor of the data processing system; and
- cause the graphics processor of the data processing system to generate the output using the lower level instructions for the graphics processor of the data processing system.

14. A system as claimed in claim 9, wherein the data processing circuitry is further configured to:
- convert an output generated by replicating the operation of the target graphics processor into an output format that corresponds to an output that would be generated by the target graphics processor.

15. A system as claimed in claim 9, wherein the target graphics processor forms part of a target system on chip that is being replicated on the data processing system.

16. A system as claimed in claim 9, wherein the graphics processor of the data processing system comprises differently configured processing circuitry to the target graphics processor.

17. A non-transitory computer readable storage medium storing computer software code which, when executing on data processing circuitry of a data processing system that comprises a graphics processor, performs a method of replicating the operation of a target graphics processor on the data processing system, the method comprising:
- converting higher level commands intended for the target graphics processor into lower level control data suitable for use by the target graphics processor;
- converting the lower level control data suitable for use by the target graphics processor into lower level control data for the graphics processor of the data processing system;
- causing the graphics processor of the data processing system to generate an output using the lower level control data for the graphics processor of the data processing system;
- converting lower level control data suitable for use by the target graphics processor into lower level control data for a central processor of the data processing system;
- causing the central processor of the data processing system to generate an output using the lower level control data for the central processor of the data processing system; and
- combining the output generated by the central processor of the data processing system with the output generated by the graphics processor of the data processing system to generate a combined output;
- wherein the central processor of the data processing system, when generating an output using the lower level control data for the central processor of the data processing system, performs at least one of:
  - operating at substantially the same precision as the target graphics processor, and
  - executing execution threads in a particular execution order.

* * * * *